United States Patent
Shin et al.

(10) Patent No.: US 10,290,097 B2
(45) Date of Patent: May 14, 2019

(54) MEDICAL IMAGING DEVICE AND METHOD OF OPERATING THE SAME

(71) Applicant: SAMSUNG MEDISON CO., LTD., Hongcheon-gun (KR)

(72) Inventors: Dong-kuk Shin, Hongcheon-gun (KR); Sang-cheol Park, Hongcheon-gun (KR)

(73) Assignee: SAMSUNG MEDISON CO., LTD., Hongcheon-gun (KR)

( * ) Notice: Subject to any disclaimer, the term of this patent is extended or adjusted under 35 U.S.C. 154(b) by 41 days.

(21) Appl. No.: 15/373,613

(22) Filed: Dec. 9, 2016

(65) Prior Publication Data
US 2017/0206653 A1    Jul. 20, 2017

(30) Foreign Application Priority Data
Jan. 18, 2016   (KR) .................. 10-2016-0005995

(51) Int. Cl.
*G06T 7/00*   (2017.01)
*G06T 7/11*   (2017.01)
(Continued)

(52) U.S. Cl.
CPC ........ *G06T 7/0012* (2013.01); *G06F 3/04842* (2013.01); *G06K 9/46* (2013.01);
(Continued)

(58) Field of Classification Search
CPC ......... G06T 7/0012; G06T 2207/10088; G06T 2207/30004; G06T 2207/10116;
(Continued)

(56) References Cited

U.S. PATENT DOCUMENTS

| | | | |
|---|---|---|---|
| 5,568,384 A | 10/1996 | Robb et al. | |
| 5,995,108 A | 11/1999 | Isobe et al. | |

(Continued)

FOREIGN PATENT DOCUMENTS

| | | | |
|---|---|---|---|
| JP | 3570576 B2 | 9/2004 | |
| JP | 5337354 B2 | 11/2013 | |

(Continued)

OTHER PUBLICATIONS

Maintz et al., "A Survey of Medical Image Registration", Medical Image Analysis, vol. 2, No. 1, Mar. 1, 1998, pp. 1-37 Oxford University Press, Oxford, GB, XP002284987.

(Continued)

*Primary Examiner* — Jingge Wu
(74) *Attorney, Agent, or Firm* — Sughrue Mion, PLLC

(57) ABSTRACT

A medical imaging device includes: a display configured to display first and second medical images having different modalities from each other with respect to an object: an image processor configured to match the first and second medical images, extract a second object corresponding to a first object selected in the first medical image from the second medical image, extract first feature information of the first object by analyzing the first medical image, and extract second feature information of the second object by analyzing the second medical image: and a controller configured to generate final diagnostic information based on the first and second feature information, and control the display to display the final diagnostic information.

16 Claims, 9 Drawing Sheets

(51) Int. Cl.
*G06F 3/0484* (2013.01)
*G06K 9/46* (2006.01)
*G06K 9/48* (2006.01)
*G06K 9/62* (2006.01)

(52) U.S. Cl.
CPC .............. *G06K 9/48* (2013.01); *G06K 9/6204* (2013.01); *G06T 7/11* (2017.01); *G06K 2209/05* (2013.01); *G06T 2200/24* (2013.01); *G06T 2207/30096* (2013.01)

(58) Field of Classification Search
CPC . G06T 2207/10072; G06T 2207/10081; G06T 2207/30096; G06T 2207/10136; G06T 2207/30061; G06T 2207/30101; G06T 7/11; G06T 7/38; G06F 19/321; G06F 3/4842; G06F 3/14; G06K 9/3233; G06K 9/46
See application file for complete search history.

(56) References Cited

U.S. PATENT DOCUMENTS

| | | |
|---|---|---|
| 7,783,094 B2 | 8/2010 | Collins et al. |
| 8,160,314 B2 | 4/2012 | Ramamurthy et al. |
| 2006/0274928 A1 | 12/2006 | Collins et al. |
| 2007/0280556 A1 | 12/2007 | Mullick et al. |
| 2008/0298660 A1* | 12/2008 | Yamagata ............... A61B 6/032 382/131 |
| 2009/0105579 A1* | 4/2009 | Garibaldi ........... A61B 1/00158 600/409 |
| 2011/0087089 A1* | 4/2011 | Meinel ................... A61B 6/502 600/411 |
| 2012/0143037 A1* | 6/2012 | Najarian ............... A61B 6/032 600/407 |
| 2012/0300904 A1* | 11/2012 | Shimada ............... A61B 6/4291 378/62 |
| 2014/0064625 A1* | 3/2014 | Kim ........................ G06K 9/48 382/203 |
| 2014/0321726 A1 | 10/2014 | Shin et al. |
| 2015/0019246 A1* | 1/2015 | Inoue ..................... G16H 15/00 705/2 |
| 2015/0178925 A1 | 6/2015 | Jo |
| 2016/0098836 A1* | 4/2016 | Yamato ................... A61B 6/50 382/128 |
| 2016/0148375 A1* | 5/2016 | Oh ........................ G06T 11/008 382/131 |
| 2016/0335766 A1* | 11/2016 | Ambwani .............. A61B 34/20 |
| 2016/0361040 A1* | 12/2016 | Tanaka ..................... A61B 8/06 |
| 2017/0018080 A1* | 1/2017 | Yokosawa ............. A61B 5/055 |
| 2017/0103520 A1* | 4/2017 | Gopinath ............ G06F 3/04842 |

FOREIGN PATENT DOCUMENTS

| | | |
|---|---|---|
| KR | 10-2008-0021723 A | 3/2008 |
| WO | 2006/017172 A1 | 2/2006 |

OTHER PUBLICATIONS

Communication dated May 17, 2017 by the European Patent Office in counterpart European Patent Application No. 16195200.7.

* cited by examiner

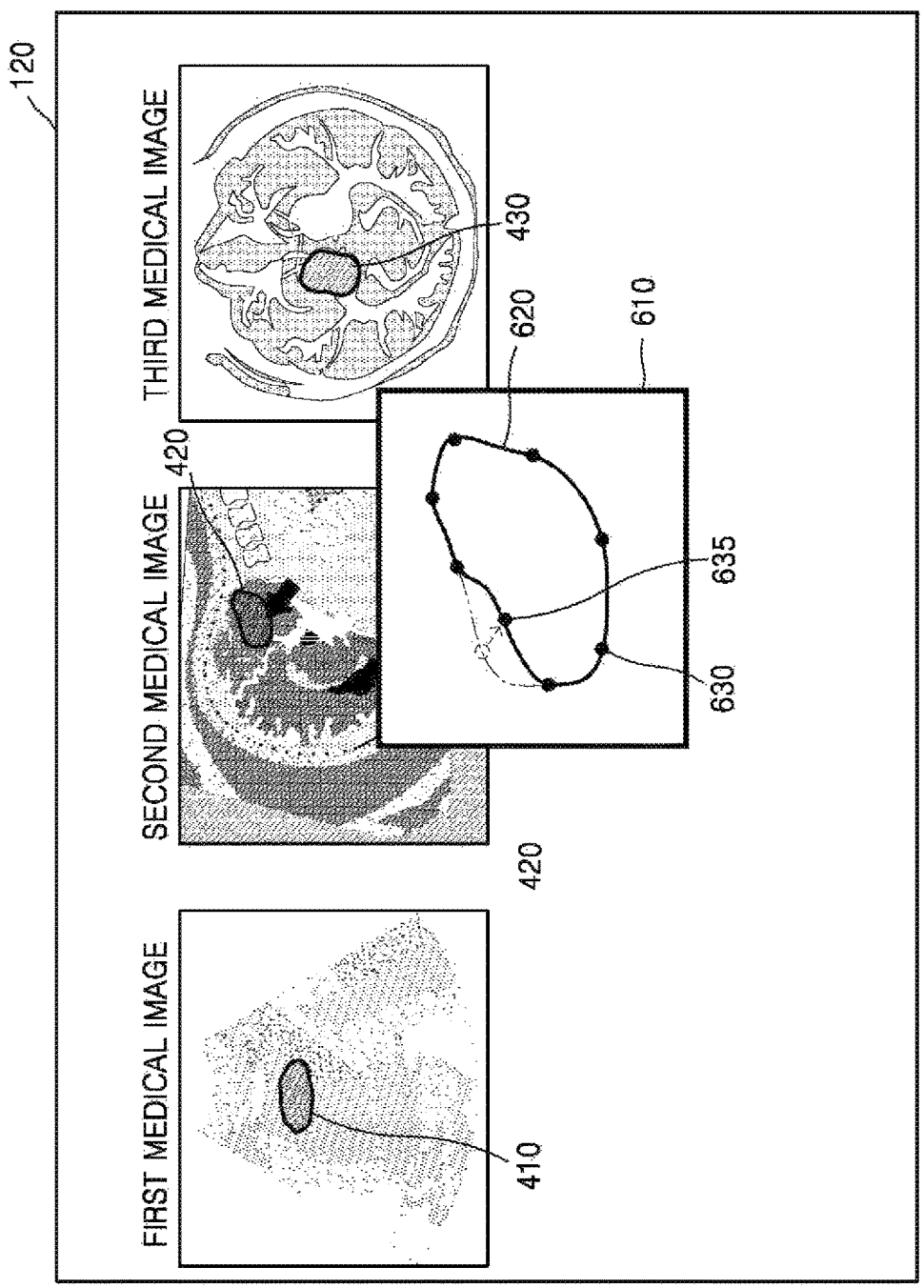

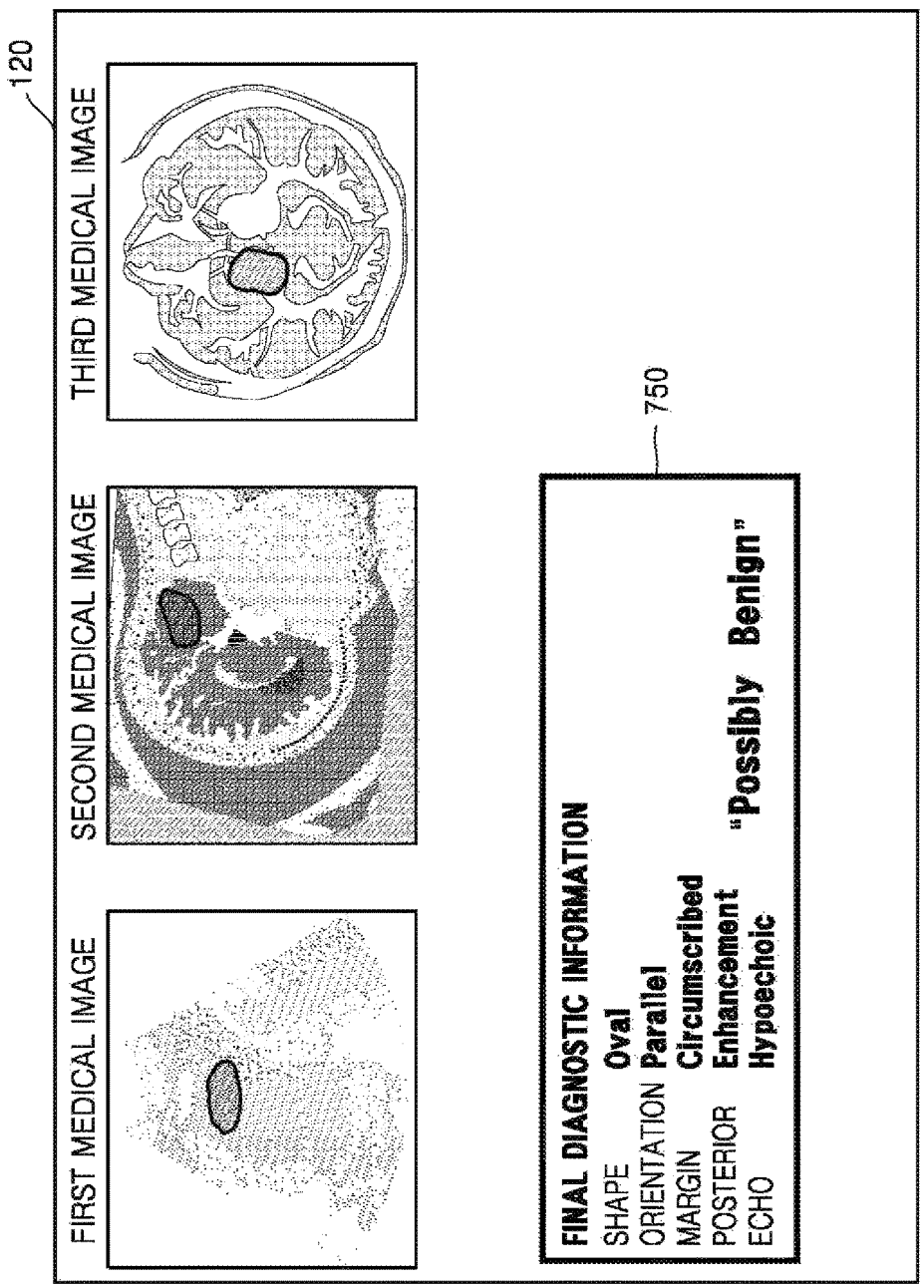

MEDICAL IMAGING DEVICE AND METHOD OF OPERATING THE SAME

CROSS-REFERENCE TO RELATED APPLICATION

This application claims the benefit of Korean Patent Application No. 10-2016-0005995, filed on Jan. 18, 2015, in the Korean Intellectual Property Office, the disclosure of which is incorporated herein in its entirety by reference.

BACKGROUND

1. Field

One or more embodiments relate to medical imaging devices and methods of operating the same, and more particularly, to medical imaging devices generating diagnostic information about an object by using medical images having different modalities from each other and methods of operating the same.

2. Description of the Related Art

Various imaging devices for obtaining information by imaging tissues of a human body are used in many medical areas for the early diagnosis of various diseases or surgical operations related to such diseases. Some examples of such medical imaging devices are ultrasonic diagnosing devices, computed tomography (CT) devices, and magnetic resonance imaging (MRI) devices. Medical imaging devices may extract a boundary of an object from an obtained medical image by using a computer aided detection (CAD) system and may provide diagnostic information about the object based on the extracted boundary.

Meanwhile, an image matching method is a processing method of adjusting separate images and displaying the images in a coordinate system. A user can see how images obtained by different measurement methods are matched with each other by the image matching method. For example, an ultrasound image, a CT image, and a magnetic resonance (MR) image may be matched with each other.

SUMMARY

One or more embodiments include medical imaging devices extracting a boundary of an object (for example, a lesion) based on medical images having different modalities from each other, and generating diagnostic information by analyzing each of the medical images based on the extracted boundary, and methods of operating the same.

One or more embodiments include medical imaging devices, wherein when an object is selected in one of medical images having different modalities from each other, remaining medical images also extract a boundary of the object, and when the boundary of the object is corrected in one of the medical images having different modalities from each other, remaining medical images also correct the boundary of the object, and methods of operating the same.

Additional aspects will be set forth in part in the description which follows and, in part, will be apparent from the description, or may be learned by practice of the presented embodiments.

According to one or more embodiments, a medical imaging device includes a display configured to display first and second medical images having different modalities from each other with respect to an object, an image processor configured to match the first and second medical images, configured to extract a second object corresponding to a first object selected in the first medical image from the second medical image, extract first feature information of the first object by analyzing the first medical image, and extract second feature information of the second object by analyzing the second medical image, and a controller configured to generate final diagnostic information based on the first and second feature information, and control the display to display the final diagnostic information.

According to one or more embodiments, a method of operating a medical imaging device includes displaying first and second medical images having different modalities from each other with respect to an object, matching the first and second medical images, extracting a second object corresponding to a first object from the second medical image, wherein the first object is selected from the first medical image, extracting first feature information with respect to the first object by analyzing the first medical image, and further extracting second feature information with respect to the second object by analyzing the second medical image, generating final diagnostic information based on the first and second feature information, and displaying the final diagnostic information.

BRIEF DESCRIPTION OF THE DRAWINGS

These and/or other aspects will become apparent and more readily appreciated from the following description of the embodiments, taken in conjunction with the accompanying drawings in which:

FIG. 6 is a view illustrating an example of correcting a result of extracting a boundary of an object, in medical images having different modalities from each other, according to an embodiment;

FIGS. 7A and 7B are views illustrating a plurality of medical images displaying final diagnostic information, which is obtained by analyzing the plurality of medical images, according to an embodiment.

DETAILED DESCRIPTION

Figure 1:
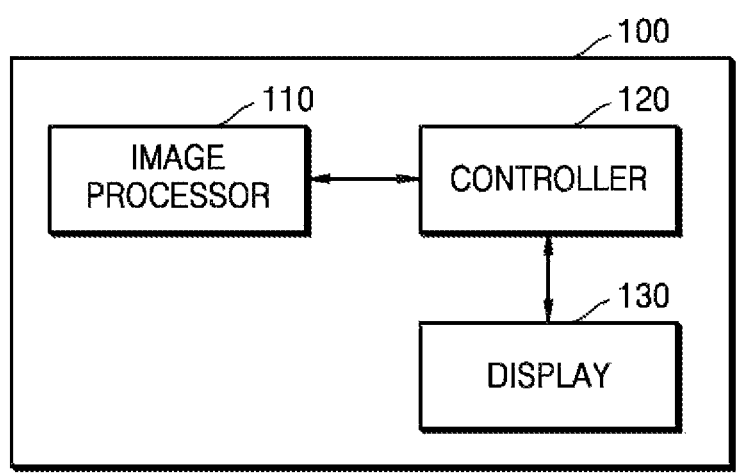
FIG. 1 is a block diagram of a medical imaging device, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

General and widely used terms have been employed herein, in consideration of functions provided in the disclosure, and may vary according to an intention of one of ordinary skill in the art, a precedent, or emergence of new technologies. Additionally, in some cases, an applicant may arbitrarily select specific terms, in which case, the applicant will provide the meaning of the terms in the description of the embodiments. Accordingly, It will be understood that the terms used herein should be interpreted as having a meaning that is consistent with their meaning in the context of the relevant art and will not be interpreted in an idealized or overly formal sense unless expressly so defined herein.

Throughout the specification, when a portion "includes" an element, another element may be further included, rather than excluding the existence of the other element, unless otherwise described. In addition, terms such as " . . . unit", " . . . module", or the like refer to units that perform at least one function or operation, and the units may be implemented as hardware or software or as a combination of hardware and software.

Throughout the specification, an "image" may refer to multi-dimensional data composed of discrete image elements. Some examples of such images are medical images (ultrasound images, computed tomography (CT) images, magnetic resonance (MR) images, X-ray images, positron emission tomography (PET) images, PET/CT images, and PET/MR images) of an object obtained by ultrasonic diagnosing devices, CT devices, MRI devices, X-ray devices, and PET device, but the inventive concept is not limited thereto.

Furthermore, an "object" may be a human, an animal, or a part of a human or animal. For example, the object may be an organ (e.g., the liver, heart, womb, brain, breast, or abdomen), a blood vessel, or a combination thereof. Also, the object may be a phantom. The phantom means a material having a density, an effective atomic number, and a volume that are approximately the same as those of an organism. For example, the phantom may be a spherical phantom having properties similar to a human body.

An ultrasound image may refer to an image obtained by transmitting ultrasound signals generated by a transducer of a probe to an object and receiving echo signals reflected from the object. Furthermore, the ultrasound image may vary. The ultrasound image may be at least one of, for example, an amplitude (A) mode image, a brightness (B) mode image, a color (C) mode image, and a Doppler (D) mode image. Also, according to an exemplary embodiment, the ultrasound image may be a 2-dimensional (2D) image or a 3-dimensional (3D) image.

The CT image may refer to a synthesized image of a plurality of X-ray images that are obtained by capturing an object while rotating about at least one axis of the object.

A magnetic resonance (MR) image may refer to an image of an object obtained based on a nuclear magnetic resonance principle.

Throughout the specification, a "user" may be, but is not limited to, a medical expert, for example, a medical doctor, a nurse, a medical laboratory technologist, or a medical imaging expert, or a technician who repairs medical apparatuses.

Below, a detailed description will be given about embodiments of the present inventive concept with reference to attached drawings such that one of an ordinary skill in the art may easily perform the embodiments. In this regard, the present embodiments may have different forms and should not be construed as being limited to the descriptions set forth herein.

FIG. 1 is a block diagram of a medical imaging device 100, according to an embodiment. Referring to FIG. 1, the medical imaging device 100 may include an image processor 110, a controller 120, and a display 130.

According to an embodiment, the image processor 110 may match medical images having different modalities from each other with respect to an object. The medical images having different modalities from each other may include medical images obtained by separate measurement methods with respect to the object. For example, medical images having different modalities from each other may include ultrasound images, X-ray images, CT images, MR images, PET images, PET/CT images, and PET/MR images, but are not limited thereto.

According to an embodiment, the image processor 110 may match first and second medical images having different modalities from each other. The image processor 110 may extract individual anatomical structures corresponding to an object from the first and second medical images and may match the first and second medical images by using the extracted individual anatomical structures.

For example, when the object is a liver, the image processor 110 may extract individual anatomical structures (for example, an inferior vena cava (IVC), a hepatic vein, a hepatic portal vein, etc.) corresponding to the liver from the first and second medical images. Furthermore, when the object is an abdomen, the image processor 110 may extract individual anatomical structures (for example, a diaphragm, a blood vessel adjacent to abdomen, etc.) corresponding to the abdomen from the first and second medical images. Furthermore, when the object is a thyroid, the image processor 110 may extract individual anatomical structures (for example, a thyroid, a carotid, a trachea, etc.) corresponding to the thyroid from the first and second medical images.

Furthermore, the image processor 110 may match the first and second medical images based on a geometric relationship between the extracted individual anatomical structures. For example, the image processor 110 may match the first and second medical images by using positions and directions of the extracted individual anatomical structures.

Furthermore, the image processor 110 may extract a first object selected from the first medical image, and may extract a second object corresponding to the first object from the second medical image. The first and second objects may be an identical anatomical individual.

When a point is selected in the first medical image, the image processor 110 may designate the selected point as a seed point of the first object, and may extract the first object by using a region growing method. For example, the image processor 110 may search points adjacent to the selected point in a preset region based on the selected point, and may include the searched points in a first object region when a difference between a brightness value of the searched points and a reference brightness value is a critical value or less.

Furthermore, the image processor 110 may detect a point matched with the point selected in the first object from the second medical image, may designate the selected point as a seed point, and may extract the second object by using a region growing method.

However, a method of extracting the first and second objects is not limited to the region growing method, and the image processor 110 may extract the first and second objects by using various known methods.

The image processor 110 may extract first feature information with respect to the first object by analyzing the first medical image, and may further extract second feature information with respect to the second object by analyzing the second medical image. For example, the image processor 110 may analyze the first medical image and may obtain information about a shape, a direction, an angle margin, a boundary of a lesion, and calcification of the first object. Furthermore, the image processor 110 may analyze the second medical image and may obtain information about a shape, a direction, an angle margin, a boundary of a lesion, and calcification of the second object.

Furthermore, the image processor 110 may obtain information about an echo pattern and a posterior acoustic feature of the first object or the second object. However, the first and second feature information is not limited thereto and the image processor 110 may include various pieces of information for diagnosing the first and second objects.

The controller 120 may control general operations of the medical imaging device 100 and a flow of signals between internal components of the medical imaging device 100. The controller 120 may include a memory storing a program or data for performing a prescribed function, and a processor processing the program or the data.

According to an embodiment, the controller 120 may generate final diagnostic information based on the first and second feature information. For example, the controller 120 may determine whether an object is benign or malignant, based on features included in the first and second feature information.

The display 130 may display a plurality of medical images having different modalities from each other. The display 130 may display not only a medical image, but also various pieces of information processed by the medical imaging device 100 on a screen image via a graphical user interface (GUI). In addition, the medical imaging device 100 may include two or more displays 130 according to embodiments.

According to an embodiment, the display 130 may display the first and second medical images having different modalities from each other, and may further display boundaries of the first and second medical images, respectively.

Furthermore, according to an embodiment, the display 130 may display the first feature information extracted from the first medical image and the second feature information extracted from the second medical image, and may further display the final diagnostic information generated based on the first and second feature information.

Figure 2:
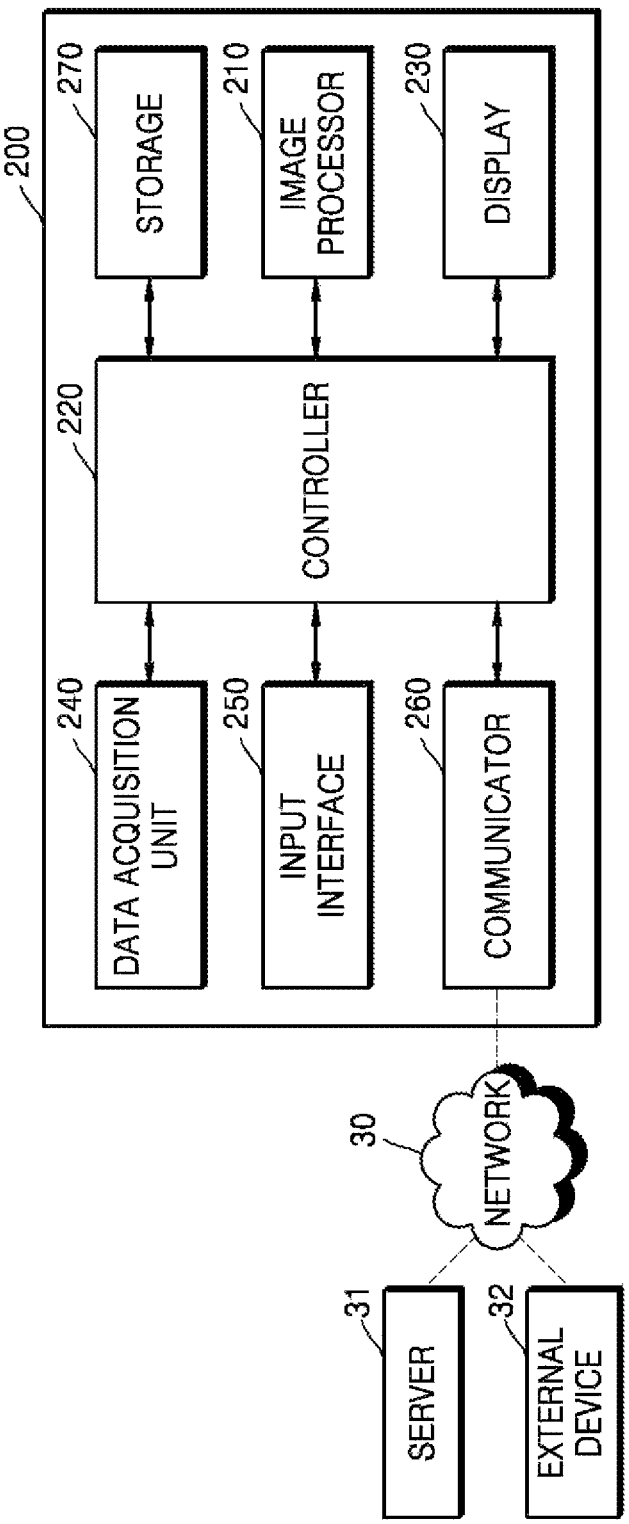
FIG. 2 is a block diagram illustrating a configuration of a medical imaging device, according to an embodiment.

FIG. 2 is a block diagram illustrating a configuration of a medical imaging device 200 according to an embodiment.

Referring to FIG. 2, the medical imaging device 200 may include an image processor 210, a controller 220, a display 230, a data acquisition unit 240, an input interface 250, a communicator 260, and a storage 270, according to an embodiment.

Meanwhile, the image processor 110 of FIG. 1 may correspond to the image processor 210 of FIG. 2, the controller 120 of FIG. 1 may correspond to the controller 220 of FIG. 2, and the display 130 of FIG. 1 may correspond to the display 230 of FIG. 2. In FIG. 2, like reference numerals in FIG. 1 denote like elements, and a duplicate description will be omitted for simplicity.

According to an embodiment, the data acquisition unit 240 may obtain medical image data of an object. The medical image data may include ultrasound data, CT data, or MR data, but is not limited thereto.

For example, the data acquisition unit 240 may transmit an ultrasound signal to an object and may receive an echo signal reflected from the object. The data acquisition unit 240 may process the received echo signal and may generate ultrasound data with respect to the object. Furthermore, the data acquisition unit 240 may transmit a radio frequency (RF) signal to an object and may receive an MR signal emitted from the object. The data acquisition unit 240 may process the received MR signal and may generate MR data with respect to the object. Furthermore, the data acquisition unit 240 may transmit an X-ray signal to an object and may sense the X-ray signal received from the object. The data acquisition unit 240 may process the sensed X-ray signal and may generate CT data with respect to the object.

However, the data acquisition unit 240 may receive medical image data generated in external medical devices such as ultrasonic diagnosing devices, MRI devices, and CT devices, without directly generating medical image data such as ultrasound data, MR data, or CT data by receiving an ultrasound signal, an MR signal, or an X-ray signal.

According to an embodiment, the medical image data may be 2D data or 3D volume data. 2D data indicates a section of an object, and 3D volume data indicates data reconfigured in a 3D form, in which many pieces of section data of an object are stored.

According to an embodiment, the image processor 210 may generate a plurality of medical images based on the medical image data. For example, the image processor 210, when ultrasound data is obtained, may generate an ultrasound image based on the ultrasound data, and when MR data is obtained, may generate an MR image based on the MR data. Furthermore, the image processor 210, when CT data is obtained, may generate a CT image based on the CT data. Furthermore, the image processor 210 may generate X-ray images, PET images, PET/CT images, and PET/MR images, but the inventive concept is not limited thereto.

According to an embodiment, a plurality of medical images may be respective medical images corresponding to various sections of an object.

Meanwhile, the image processor 210 may match medical images having different modalities from each other. The medical images having different modalities from each other may be images generated by the image processor 210 by using medical image data, but are not limited thereto. The medical images having different modalities may be medical images received from an external device through the communicator 260, or medical images loaded from the storage 270. Furthermore, the image processor 210 may analyze each of the matched medical images having different modalities from each other, and may extract feature information of an object.

The display 230 may display a medical image generated in the image processor 210, a medical image received via the communicator 260, and a medical image loaded in the storage 270. Furthermore, the display 230 may display various pieces of information processed in the medical imaging device 200. In addition, the medical imaging device 200 may include two or more displays 230 according to embodiments. Furthermore, if the display 230 includes a touch screen with a touchpad, the display 230 may also be used as an input device as well as an output device.

The display 230 may include at least one of a liquid crystal display (LCD), a thin film transistor-LCD (TFT-LCD), an organic light-emitting diode (OLED) display, a flexible display, a 3D display, and an electrophoretic display.

The controller 220 may control general operations of the medical imaging device 200 and a flow of signals between internal components of the medical imaging device 200. The controller 220 may include a memory storing a program or data for performing a prescribed function, and a processor processing the program or the data. Furthermore, the controller 220 may receive a control signal from the input interface 250 or an external device, and may control operations of the medical imaging device 200.

The communicator 260 is connected to the network 30 by wire or wirelessly to communicate with a server 31 or an external device 32. The external device 32 may include, for example, a medical device and a portable device. Furthermore, the portable device may include a communication terminal, a tablet personal computer (PC), a medical terminal, and a wearable device.

The communicator 260 may include one or more components for communication with servers or external devices. For example, the communicator 260 may include a local area communicator, a wired communicator, and a mobile communicator.

The local area communicator refers to a module for local area communication within a prescribed distance. Examples of local area communication techniques according to an embodiment may include, but are not limited to, wireless LAN, Wi-Fi, Bluetooth, ZigBee, Wi-Fi Direct (WFD), ultra wideband (UWB), infrared data association (IrDA), Bluetooth low energy (BLE), and near field communication (NFC).

The wired communicator refers to a module for communication using electric signals or optical signals. Examples of wired communication techniques according to an embodiment may include communication via a twisted pair cable, a coaxial cable, an optical fiber cable, and an Ethernet cable.

The mobile communicator transmits or receives wireless signals to or from at least one selected from a base station, an external terminal, and a server on a mobile communication network. Here, the wireless signal may be a voice call signal, a video call signal, or data in any one of various formats according to transmission and reception of a text/multimedia message.

The communicator 260 may transmit or receive a control signal and data with the server 31 or the external device 32 via a medical image information system (PACS).

The communicator 260 may receive a control signal from the server 31 or the external device 32, and the controller 220 may generally control operations of the medical imaging device 200 according to the received control signal. For example, the controller 220 may control obtaining of medical image data; processing, displaying and storing of medical image; and transmitting or receiving of data.

Furthermore, the communicator 260 may transmit or receive data related to diagnosis of an object or medical image data via the server 31 or the external device 32.

The storage 270 may store a variety of data or programs for operating and controlling the medical imaging device 200. Furthermore, the storage 270 may store various pieces of information processed in the medical imaging device 200. For example, the storage 270 may store medical data related to object diagnosis such as medical image data and medical images to be input or output, and may further store an algorithm or a program performed in the medical imaging device 200.

The storage 270 may be any of various storage media, e.g., a flash memory, a hard disk drive, EEPROM, etc. Furthermore, the medical imaging device 200 may utilize web storage or a cloud server that performs the storage function of the storage 270 online.

The input interface 250 may receive data for controlling the medical imaging device 200 from a user. For example, the input interface 250 may include a button, a keypad, a mouse, a touch pad, a touch screen, a track ball, a jog switch, and a knop, but is not limited thereto.

If the input interface 250 includes a touch screen, a medical image in a prescribed mode and a control panel for the medical image may be displayed on the touch screen. Furthermore, the medical imaging device 200 may sense a touch gesture of a user corresponding to a medical image via the touch screen. Furthermore, the medical imaging device 200 may include some buttons that are frequently used by a user among buttons that are included in a control panel of a general medical imaging device, and provide the remaining buttons in the form of a graphical user interface (GUI) via a touch screen.

All or some of the image processor 210, the controller 220, the display 230, the data acquisition unit 240, the input interface 250, the communicator 260, and the storage 270 may be implemented as software modules. However, embodiments of the present invention are not limited thereto, and some of the components stated above may be implemented as hardware modules.

Figure 3:
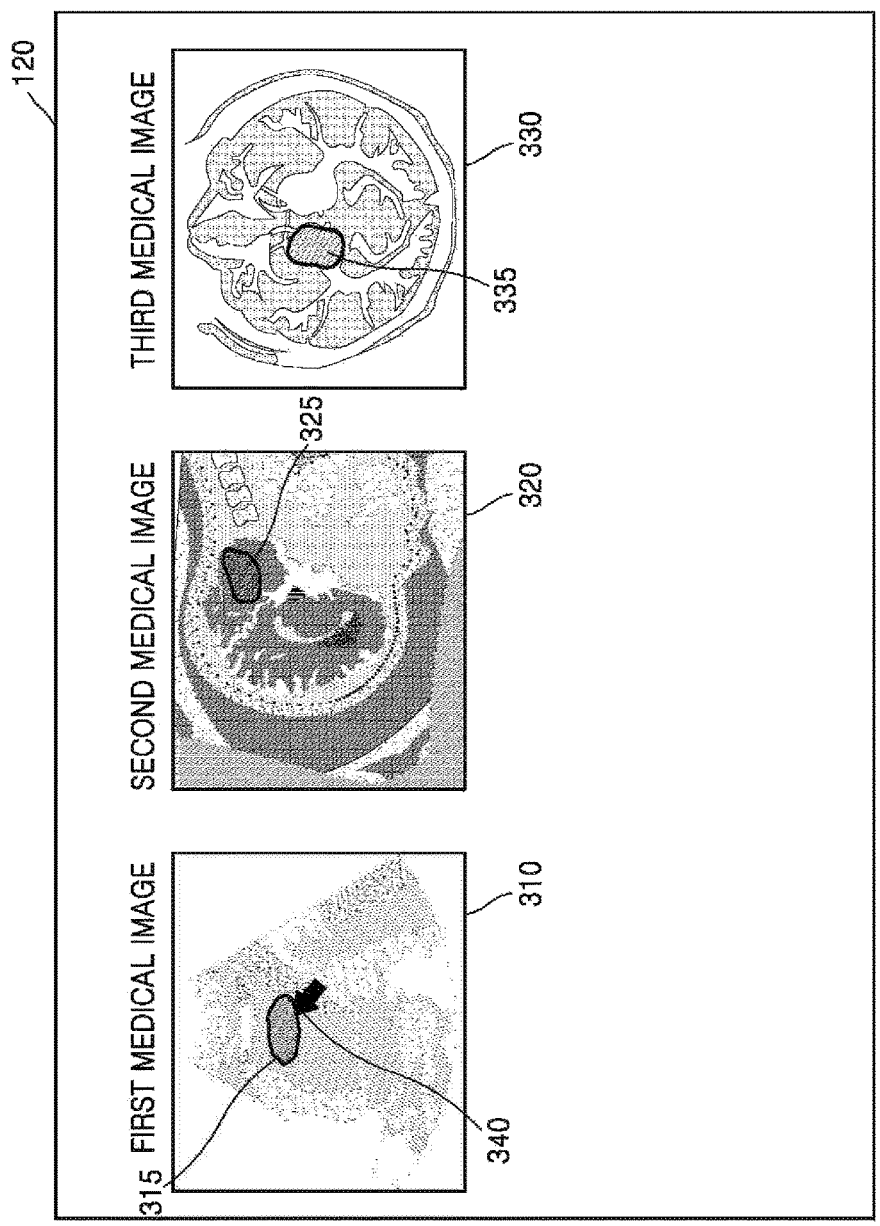
FIG. 3 is a view illustrating a plurality of medical images that are displayed on a display according to an embodiment.

FIG. 3 is a view illustrating a plurality of medical images that are displayed on a display 120 according to an embodiment.

Referring to FIG. 3, according to an embodiment, the medical imaging device 100 may display medical images having different modalities from each other with respect to an object on the display 120. The medical images according to the embodiment may include ultrasound images, X-ray images, CT images, MR images, PET images, PET/CT images, and PET/MR images, but are not limited thereto.

For example, the medical imaging device 100 may display first to third medical images 310 to 330, wherein the first medical image 310 may be an ultrasound image, the second medical image 320 may be a CT image, and the third medical image 330 may be an MR image, but the inventive concept is not limited thereto.

Furthermore, the medical images according to the embodiment may be matched images with each other. For example, the first medical image 310 and the second medical image 320 may be matched with each other, the first medical image 310 and the third medical image 330 may be matched with each other, and the second medical image 320 and the third medical image 330 may be matched with each other.

According to an embodiment, the medical imaging device 100 may receive a user input 340 selecting a first object in the first medical image 310. For example, the medical imaging device 100 may receive an input selecting a point included in the first object, and an input selecting a prescribed region including the first object.

The medical imaging device 100 may extract a boundary 315 of the first object. For example, when a point included in the first object is selected, the medical imaging device 100 may designate the selected point as a seed point of the first object, and may extract the boundary 315 of the first object by using a region growing method. In addition, it is possible to segment the first object in the first medical image 310.

Furthermore, the medical imaging device 100 may extract objects corresponding to the first object from the second and third medical images 320 and 330.

For example, the medical imaging device 100 may detect a point matched with the point selected in the first medical image 310 from the second medical image 320, may designate the selected point as a seed point, and may extract a boundary 325 of a second object corresponding to the first object by using a region growing method. Furthermore, the medical imaging device 100 may detect a point matched with the point selected in the first medical image 310 from the third medical image 330, may designate the selected point as a seed point, and may extract a boundary 335 of a third object corresponding to the first object by using a region growing method. Here, each modality displays individual anatomical structures in different ways even though the first to third objects are the same individual anatomical structures, and thus, boundaries of objects respectively extracted from the first to third medical images 310 to 330 may be different from each other.

For example, an ultrasound image, as performing rapid inspection in real time without using radiation harmful to human body compared to medical images having another modalities, may be advantageous for monitoring a treatment progress, and may display thyroid, breast, scrotum, musculoskeletal system, or heart as well as organs such as liver, gall bladder, pancreas, spleen, and kidney, or pelvic cavity organs such as bladder, womb, ovary, and prostate gland. Furthermore, a CT image, compared to medical images having other modalities, may display a bone, a calcificated lesion, cerebral hemorrhage, lung or heart, and organs in which peristalsis occurs. Furthermore, an MR image, compared to medical images having other modalities, may display a muscle, a ligament, brain-nervous system, a tumor, and a soft tissue well.

Figure 4:
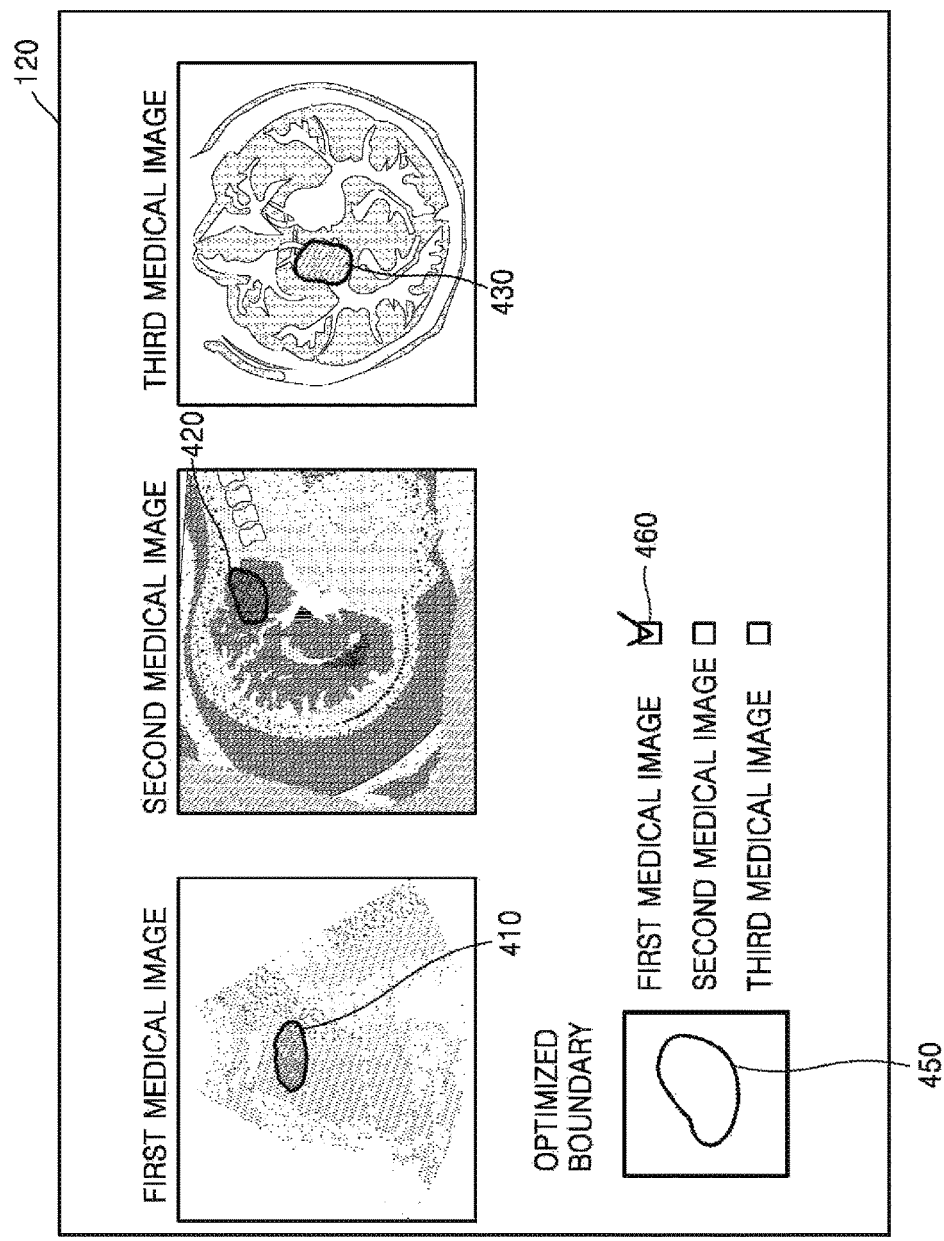
FIG. 4 is a view illustrating an example of correcting a result of extracting a boundary of an object, in medical images having different modalities from each other, according to an embodiment.

FIG. 4 is a view illustrating an example of correcting a result of extracting a boundary of an object, in medical images having different modalities from each other, according to an embodiment.

Referring to FIG. 4, according to an embodiment, the medical imaging device 100 may display medical images having different modalities from each other, and may display the result of extracting a boundary of an object on each of the medical images.

For example, as described above in FIG. 3, when receiving an input of selecting an object from any one of a plurality of medical images (first to third medical images), the medical imaging device 100 may segment the object in each of the medical images and may extract a boundary of the object. Furthermore, the medical imaging device 100 may display a boundary 410 of the first object on the first medical image, a boundary 420 of the second object on the second medical image, and a boundary 430 of the third object on the third medical image, according to a result of the boundary extraction.

According to an embodiment, the medical imaging device 100, based on a boundary of an object displayed on any one of a plurality of medical images, may correct boundaries of objects displayed on remaining medical images.

For example, the medical imaging device 100 may receive an input selecting the first medical image from among the plurality of medical images (or, an input selecting the boundary 410 of the first object displayed on the first medical image). When the first medical image is selected, the medical imaging device 100 may correct the boundary 420 of the second object and the boundary 430 of the third object based on the boundary 410 of the first object. For example, the medical imaging device 100 may correct the boundary 420 of the second object to correspond to the boundary 410 of the first object, by using a matching result of the first and second medical images. Furthermore, the medical imaging device 100 may correct the boundary 430 of the third object to correspond to the boundary 410 of the first object, by using a matching result of the first and third medical images, but the inventive concept is not limited thereto.

Furthermore, according to an embodiment, the medical imaging device 100, based on boundaries of objects extracted from a plurality of medical images, may generate an optimized boundary of an object. For example, the medical imaging device 100 may generate an optimized boundary of an object by using various calculation values (for example, average values) based on the boundary 410 of the first object, the boundary 420 of the second object, and the boundary 430 of the third object.

The medical imaging device 100 may display the optimized boundary and may correct at least one from among the boundary 410 of the first object, the boundary 420 of the second object, and the boundary 430 of the third object, to the optimized boundary. For example, as illustrated in FIG. 4, when receiving a user input selecting a check box 460 corresponding to each medical image displayed on a display 120, the medical imaging device 100 may control a boundary displayed on a medical image corresponding to the selected check box to be corrected to an optimized boundary.

Figure 5:
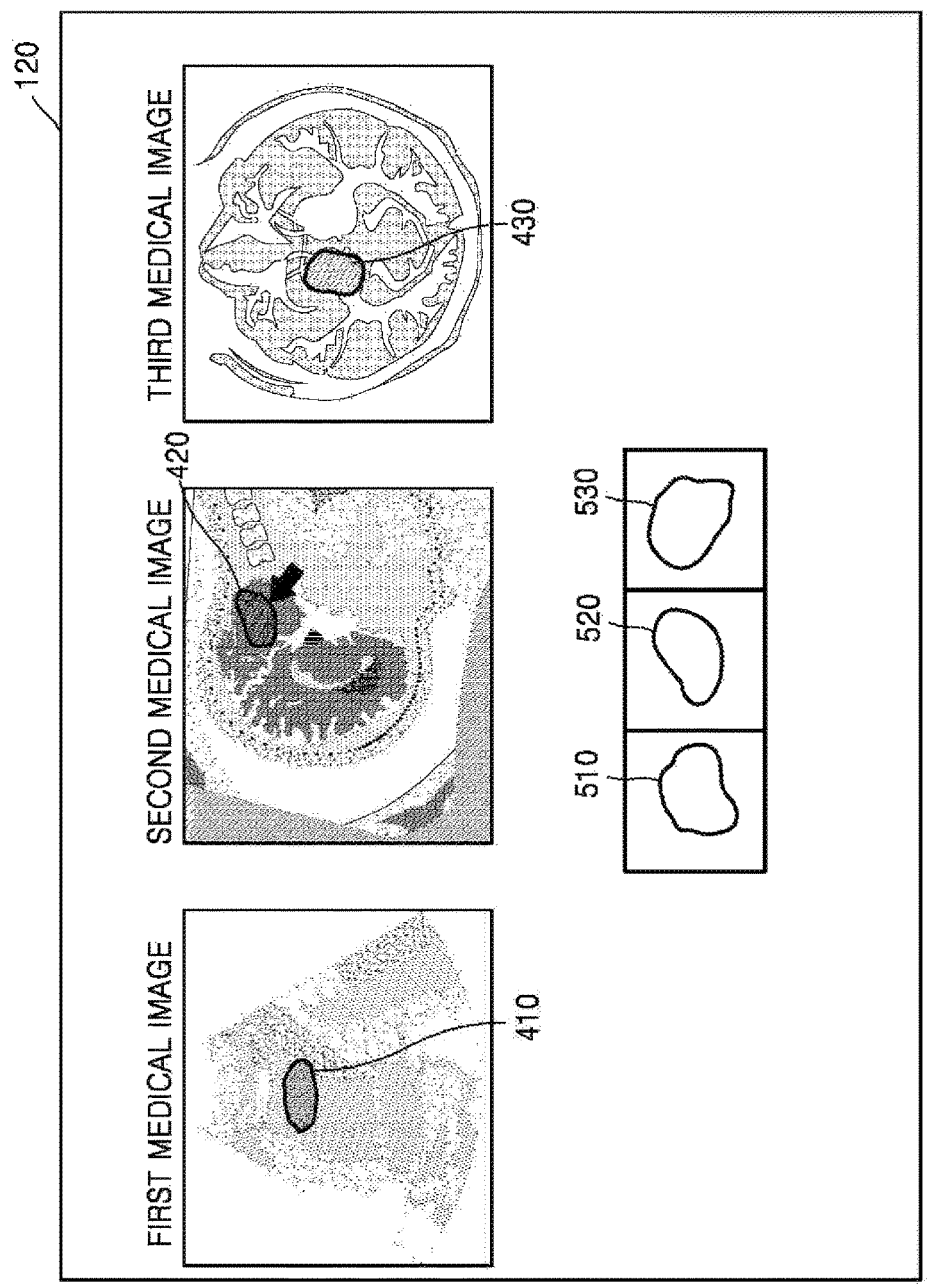
FIG. 5 is a view illustrating an example of correcting a result of extracting a boundary of an object, in medical images having different modalities from each other, according to an embodiment.

FIG. 5 is a view illustrating an example of correcting a result of extracting a boundary of an object, in medical images having different modalities from each other, according to an embodiment.

Referring to FIG. 5, according to an embodiment, the medical imaging device 100 may display medical images having different modalities from each other, and may display the result of extracting a boundary of an object on each of the medical images. For example, a boundary 410 of a first object may be displayed on a first medical image, a boundary 420 of a second object on a second medical image, and a boundary 430 of a third object on a third medical image.

The medical imaging device 100 may receive an input correcting any one of the boundaries of the objects respectively displayed on the plurality of medical images. For example, when receiving an input selecting the boundary 420 of the second object displayed on the second medical image, the medical imaging device 100 may display candidate boundaries corresponding to the second object.

For example, as illustrated in FIG. 5, the candidate boundaries may include first to third candidate boundaries 510 to 530, wherein the first to third candidate boundaries 510 to 530 may be boundaries extracted by using respective algorithms. The medical imaging device 100 may receive an input selecting one of the candidate boundaries, and may correct the boundary 420 of the second object displayed on the second medical image to the selected candidate boundary.

Furthermore, when the boundary 420 of the second object on the second medical image is corrected, the medical imaging device 100 may also correct the boundary 410 of the first object and the boundary 430 of the third object based on the corrected boundary 420 of the second object. For example, the medical imaging device 100 may correct the boundary 410 of the first object to correspond to the corrected boundary 420 of the second object, by using a matching result of the first and second medical images. Furthermore, the medical imaging device 100 may correct the boundary 430 of the third object to correspond to the corrected boundary 420 of the second object, by using a matching result of the second and third medical images, but the inventive concept is not limited thereto.

FIG. 6 is a view illustrating an example of correcting a result of extracting a boundary of an object, in medical images having different modalities from each other, according to an embodiment.

Referring to FIG. 6, according to an embodiment, the medical imaging device 100 may display medical images having different modalities from each other, and may display the result of extracting a boundary of an object on each of the medical images. For example, a boundary 410 of a first object may be displayed on a first medical image, a boundary 420 of a second object on a second medical image, and a boundary 430 of a third object on a third medical image.

The medical imaging device 100 may receive an input correcting any one of the boundaries of the objects respectively displayed on the plurality of medical images. For example, when receiving an input selecting the boundary 420 of the second object displayed on the second medical image, the medical imaging device 100 may display a window 610 capable of correct the boundary 420 of the second object. For example, as illustrated in FIG. 6, the window 610 may display an enlarged boundary 620 of the second object, and may further display a plurality of dots 630 forming the boundary 620 of the second object.

The medical imaging device 100 may change a position of at least one of the plurality of dots 630 by receiving a user input, may correct the boundary 620 to pass through a dot 635 having the changed position, or may add a dot and correct the boundary 620 to pass through the added dot. Furthermore, the medical imaging device 100 may display the boundary corrected in the window 610 by applying to the boundary 420 of the second object displayed on the second medical image.

Furthermore, when the boundary 420 of the second object on the second medical image is corrected, the medical imaging device 100 may also correct the boundary 410 of the first object and the boundary 430 of the third object based on a second boundary corrected in the first and third medical images. For example, the medical imaging device 100 may correct the boundary 410 of the first object to correspond to the corrected boundary 420 of the second object, by using a matching result of the first and second medical images. Furthermore, the medical imaging device 100 may correct the boundary 430 of the third object to correspond to the corrected boundary 420 of the second object, by using a matching result of the second and third medical images, but the inventive concept is not limited thereto.

Figure 7A:
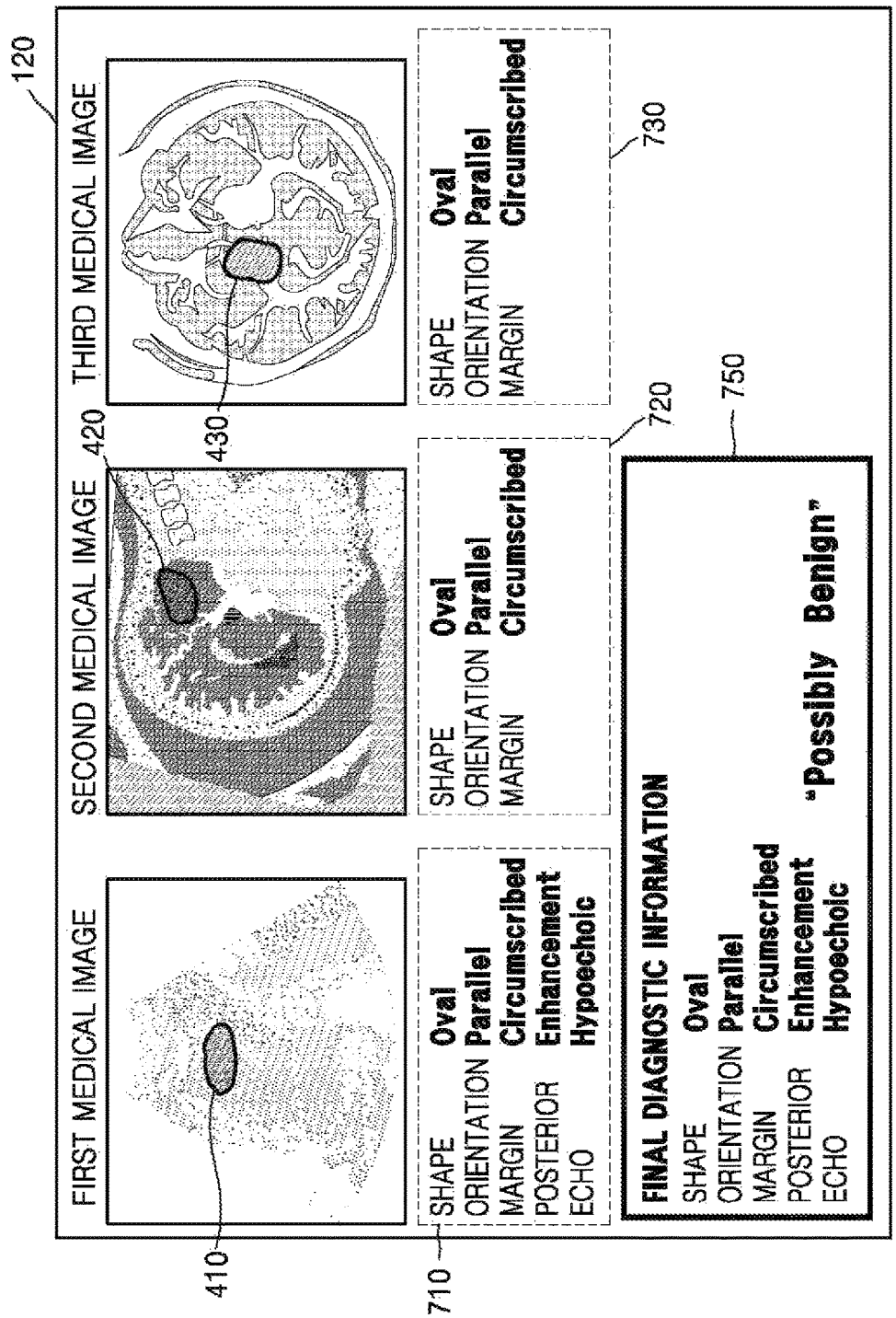

FIGS. 7A and 7B are views illustrating a plurality of medical images displaying final diagnostic information, which is obtained by analyzing the plurality of medical images, according to an embodiment.

The medical imaging device 100 may analyze each of the plurality of medical images based on a boundary of an object displayed on each of the plurality of medical images, and may extract feature information of each object.

According to an embodiment, the feature information may include information about a shape, a direction, an angle margin, a boundary of a lesion, and calcification of each object. Furthermore, the feature information may include information about an echo pattern and a posterior acoustic feature of each object.

For example, as illustrated in FIG. 7A, the medical imaging device 100 may analyze a first medical image based on a boundary 410 of a first object displayed on a first medical image, and may extract feature information (first feature information 710) of the first object. Furthermore, the medical imaging device 100 may analyze a second medical image based on a boundary 420 of a second object displayed on a second medical image, and may extract feature information (second feature information 720) of second object. Moreover, the medical imaging device 100 may analyze a third medical image based on a boundary 430 of a third object displayed on a third medical image, and may extract feature information (third feature information 730) of third object.

As illustrated in FIG. 7A, the medical imaging device 100 may display the first to third feature information 710 to 730 on a display 120.

According to an embodiment, the medical imaging device 100 may generate final diagnostic information of an object based on the first to third feature information 710 to 730. The medical imaging device 100 may determine features of an object based on the first to third feature information 710 to 730. Some of features of an object may be shown only in a part of a plurality of medical images. For example, some of features of an object included in the first feature information 710 may not be included in the second feature information 720 or the third feature information 730. The medical imaging device 100 may determine features of an object by considering the first to third feature information 710 to 730 overall. Furthermore, the medical imaging device 100 may determine whether the object is benign or malignant, based on the determined features.

According to an embodiment, as illustrated in FIGS. 7A and 7B, the medical imaging device 100 may display final diagnostic information 750 including the determined feature information of the object and the information (for example, "Possibly Benign") about whether the object is benign or malignant, based on the first to third feature information 710 to 730.

Meanwhile, referring to FIG. 7B, the medical imaging device 100 may only display the final diagnostic information 750 including the determined feature information of the object and the information about whether the object is benign or malignant based on the first to third feature information 710 to 730, without displaying the first to third feature information 710 to 730.

Figure 8:
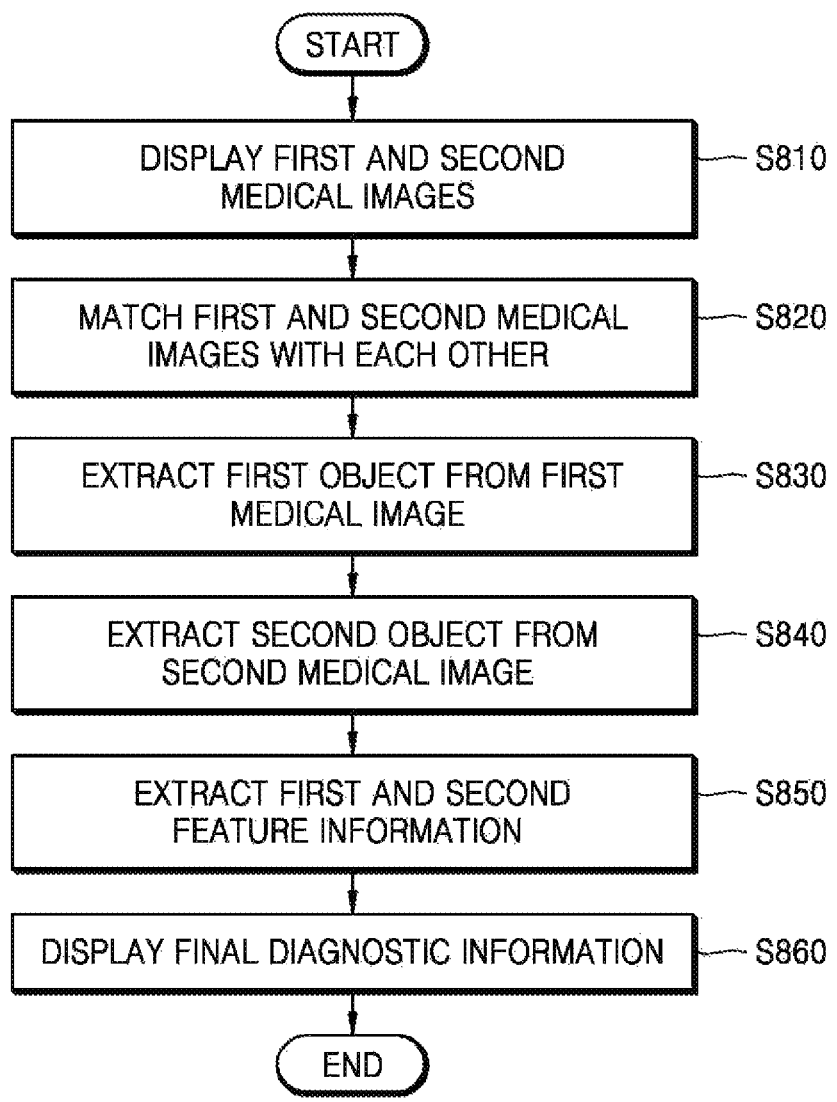
FIG. 8 is a flowchart of a method of operating a medical imaging device according to an embodiment.

FIG. 8 is a flowchart of a method of operating a medical imaging device according to an embodiment.

Referring to FIG. 8, according to an embodiment, the medical imaging device 100 may display first and second medical images having different modalities from each other (S810).

For example, the first and second medical images may include at least one of ultrasound images, X-ray images, CT images, MR images, PET images, PET/CT images, and PET/MR images.

The medical imaging device 100 may match the first and second medical images with each other (S820).

For example, the medical imaging device 100 may extract individual anatomical structures corresponding to an object from the first and second medical images, and may match the first and second medical images based on a geometric relationship between the extracted individual anatomical structures.

The medical imaging device 100 may extract a first object from the first medical image (S830).

For example, when a point is selected in the first medical image, the medical imaging device 100 may designate the selected point as a seed point of the first object, and may extract the first object by using a region growing method. The medical imaging device 100 may search points adjacent to the selected point in a preset region based on the selected point, and may include the searched points in a first object region when a difference between a brightness value of the searched points and a reference brightness value is a critical value or less.

The medical imaging device 100 may extract a second object corresponding to the first object from the second medical image (S840).

For example, the medical imaging device 100 may detect a point matched with the point selected in the first object from the second medical image, may designate the selected point as a seed point, and may extract the second object by using a region growing method.

However, a method of extracting the first and second objects is not limited to the region growing method, the image processor 110 may extract the first and second objects by using various known methods.

The medical imaging device 100 may extract first feature information with respect to the first object by analyzing the first medical image, and may extract second feature information with respect to the second object by analyzing the second medical image (S850).

For example, the medical imaging device 100 may analyze the first medical image and may obtain information about a shape, a direction, an angle margin, a boundary of a lesion, and calcification of the first object. Furthermore, the medical imaging device 100 may analyze the second medical image and may obtain information about a shape, a direction, an angle margin, a boundary of a lesion, and calcification of the second object.

Furthermore, the medical imaging device 100 may obtain information about an echo pattern and a posterior acoustic feature of the first object or the second object. However, the first and second feature information is not limited thereto and the medical imaging device 100 may include various pieces of information for diagnosing the first and second objects.

The medical imaging device 100 may generate final diagnostic information based on the first and second feature information, and may display the generated final diagnostic information (S860).

The medical imaging device 100 may determine features of an object by considering the first and second feature information overall. Furthermore, the medical imaging device 100 may determine whether the object is benign or malignant, based on the determined features.

According to an embodiment, the medical imaging device 100 may display final diagnostic information including the determined feature information of the object and the information (for example, "Possibly Benign") about whether the object is benign or malignant.

The medical imaging device and the method of operating the same according to the embodiments can also be embodied as computer-readable codes on a non-transitory computer-readable recording medium. The non-transitory computer-readable recording medium is any data storage device that can store data which can thereafter be read by a computer system. ROM, RAM. Examples of the non-transitory computer-readable recording medium include read-only memory (ROM), random-access memory (RAM), CD-ROMs, magnetic tapes, floppy disks, optical data storage devices, etc. The non-transitory computer-readable recording medium can also be distributed over network coupled computer systems so that the computer-readable code is stored and executed in a distributive manner.

According to an embodiment, accuracy of diagnostic information of an object may increase as generating the diagnostic information by using medical images having different modalities from each other.

According to an embodiment, use convenience of a user may be improved since the user is required to select an object or correct a boundary of the object in only one of medical images having different modalities from each other.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the inventive concept as defined by the following claims.

What is claimed is:

1. A medical imaging device comprising:
a display configured to display first and second medical images having different modalities from each other with respect to an object;
an image processor; and
a memory configured to store instructions that, when executed by the image processor, cause the image processor to perform operations of:
matching the first and second medical images based on a geometric relationship between individual anatomical structures extracted from the first and second medical images;
receiving a selection of a first object in the first medical image based on a first input;
extracting a first boundary of the first object in the first medical image, and further extracting a second boundary of a second object corresponding to the first boundary of the first object from the second medical image matched with the first medical image;
receiving a second input correcting one of the first boundary in the first medical image and the second boundary in the second medical image;
correcting the one of the first boundary and the second boundary, and further correcting another of the first boundary and the second boundary based on the corrected boundary;
extracting first feature information including information used for diagnosing the first object by analyzing a corrected first medical image;
extracting second feature information including information used for diagnosing the second object by analyzing a corrected second medical image matched with the first medical image;
generating final diagnostic information of the object based on the first and second feature information; and
controlling the display to display the final diagnostic information.

2. The medical imaging device of claim 1, wherein the instructions further cause the image processor to perform operations of:
acquiring first and second medical image data having different modalities from each other;
generating the first medical image based on the first medical image data; and
generating the second medical image based on the second medical image data.

3. The medical imaging device of claim 1, wherein the instructions further cause the image processor to perform an operation of:
controlling the display to display the first and second boundaries.

4. The medical imaging device of claim 3, wherein the instructions further cause the image processor to perform an operation of:
extracting the first and second feature information based on a third boundary calculated based on the first and second boundaries.

5. The medical imaging device of claim 4, wherein the instructions further cause the image processor to perform an operation of:
controlling the display to display the third boundary.

6. The medical imaging device of claim 3, wherein the instructions further cause the image processor to perform operations of:
controlling the display to display a list comprising at least one boundary candidate with respect to the first object, and
correcting the first and second boundaries based on a boundary candidate selected from the list.

7. The medical imaging device of claim 1, wherein
the first feature information comprises at least one of information about a shape, a direction, an angle margin, a boundary of a lesion, calcification, an echo pattern, and a posterior acoustic feature of the first object, and
the second feature information comprises at least one of information about a shape, a direction, an angle margin, a boundary of a lesion, calcification, an echo pattern, and a posterior acoustic feature of the second object.

8. The medical imaging device of claim 1, wherein the instructions further cause the image processor to perform an operation of:
determining whether the first object is benign or malignant based on the first and second feature information, and wherein
the final diagnostic information comprises information of whether the first object is benign or malignant.

9. The medical imaging device of claim 1, wherein
the first and second medical images comprises at least one of ultrasound images, X-ray images, computed tomography (CT) images, magnetic resonance (MR) images, positron emission tomography (PET) images, PET/CT images, and PET/MR images.

10. A method of operating a medical imaging device, the method comprising:
displaying first and second medical images having different modalities from each other with respect to an object;
matching the first and second medical images based on a geometric relationship between individual anatomical structures extracted from the first and second medical images;
receiving a selection of a first object in the first medical image based on a first input;
extracting a first boundary of the first object in the first medical image, and further
extracting a second boundary of a second object corresponding to the first boundary of the first object from the second medical image matched with the first medical image;
receiving a second input correcting one of the first boundary in the first medical image and the second boundary in the second medical image;
correcting the one of the first boundary and the second boundary, and further correcting another of the first boundary and the second boundary based on the corrected boundary;
extracting first feature information including information used for diagnosing the first object by analyzing a corrected first medical image, and further extracting second feature information including information used for diagnosing the second object by analyzing a corrected second medical image matched with the first medical image;
generating final diagnostic information of the object based on the first and second feature information; and
displaying the final diagnostic information.

11. The method of claim 10, further comprising:
acquiring first and second medical image data having different modalities from each other; and
generating the first medical image based on the first medical image data, and further generating the second medical image based on the second medical image data.

12. The method of claim 10, further comprising:
displaying the first and second boundaries.

13. The method of claim 12, further comprising:
calculating a third boundary based on the first and second boundaries, and
the extracting of the first and second feature information comprises extracting the first and second feature information based on the third boundary.

14. The method of claim 12, further comprising:
displaying a list comprising at least one boundary candidate with respect to the first object; and
correcting the first and second boundaries based on a boundary candidate selected from the list.

15. The method of claim 10, wherein
the generating of the final diagnostic information comprises:
determining whether the first object is benign or malignant based on the first and second feature information, wherein
the final diagnostic information comprises:
information of whether the first object is benign or malignant.

16. A non-transitory computer-readable recording medium having recorded thereon a program for executing a method of claim 10.

* * * * *